2,758,988

PETROLEUM RESINS FROM SOLVENT EXTRACTED FRACTIONS

Fred W. Banes and Joseph F. Nelson, Westfield, and Herbert K. Wiese, Cranford, N. J., assignors to Esso Research and Engineering Company, a corporation of Delaware No Drawing. Application May 12, 1953,
Serial No. 354,659

10 Claims. (Cl. 260—82)

This invention relates to a process whereby unsaturated petroleum fractions are subjected to selective extraction to give improved unsaturated hydrocarbon feeds for polymerization reactions and to the improved petroleum resins obtained thereby.

Hydrocarbon resins can be produced from certain petroleum refinery streams containing mixtures of olefins and diolefins by polymerization using Friedel-Crafts catalysts. The stream cracked streams have been found especially useful for this purpose. For example, heavier petroleum fractions such as naphtha, gas oil, and the like, are cracked at relatively low pressure and at temperatures of 1000 to 1600° F. in the presence of steam and for relatively short contact times. The gas and liquid streams so produced contain large quantities of diolefins and olefins in the $C_5$ and $C_{10}$ range. The naphtha distillate streams obtained by steam cracking operations, boiling in the range of 30 to 300° C., contain large amounts of diolefins, olefins, aromatics and minor quantities of paraffins. The resins produced from these streams, however, generally have softening points lower than desired for certain applications, such as, for example, in floor tile compositions. Also, the unsaturation and aniline points of these resins are higher than desired for this application. The aniline point is a measure of the resin aromaticity, lower values of aniline point indicating higher aromaticity. For use as the binding ingredient in floor tile, for example, it is desirable that hydrocarbon resins have softening points of at least 110° C. or greater and iodine numbers of about 100 or lower so that the floor tiles made therefrom have the required indentation characteristics, flexibility, and impact resistance. It is preferred that the aniline points of the resins be 50 or lower so that low cost pitch-type plasticizers can be used in the formulations. Most of the resins that are produced from hydrocarbon streams by Friedel-Crafts polymerization have softening points lower than 100° C. unless an undue amount of stripping is employed.

It has now been discovered that greatly improved and superior resins can be prepared by certain treatment of the hydrocarbon feed streams prior to their polymerization. Thus, it has been found possible to start with a steam-cracked hydrocarbon stream boiling in the range of 35 to 285° C., and containing less than 20 weight per cent of material boiling below 130° C. Preferably, the stream should boil in the range of 115 to 275° C. and, by selective solvent extraction, produce a superior polymerizable hydrocarbon extract.

Although it is not intended to limit this invention in any way to a theory, it is believed that the good results obtained as a result of the extraction are brought about because of an enrichment of the extract in the vinyl aromatic compounds. The extraction is believed to reject the more undesirable olefins, paraffins, and most of the aliphatic diolefins.

The extraction may be either of the vapor-liquid, or liquid-liquid type. Preferably, the extraction is carried out entirely in the liquid phase using solvents which have a reasonably high selectivity for aromatic compounds. These selective solvents include such compounds as di-, tri-, tetra or penta ethylene glycol or mixtures thereof, or $\beta,\beta'$-oxydipropionitrile and the like, or mixtures of these materials. Minor quantities of antisolvents such as water or ethylene glycol may be employed if desired. Other solvents such as furfural, furfural alcohol or phenol may be used but are less desirable because of the increased difficulty of separating hydrocarbons from the extract phase. The extraction with the selected solvent or solvents is carried out at temperatures ranging from $-10$ to 75° C. and at pressures up to 200 pounds per square inch and can be done either in a batch or continuous manner. The extraction itself is best carried out by countercurrent flow of solvent and hydrocarbons through one or more extraction stages. The extracted hydrocarbons are separated from the enriched extract by water dilution, steam stripping, or by atmospheric or vacuum distillation. The particular conditions of extraction and the method employed for recovering the extracted fraction depends on the exact solvent employed and the composition of the stream extracted.

Typical unsaturated hydrocarbon extracts useful for feeds in making these resins boil from 35 to 285° C. The specific dispersion of the polymerization feed should be 200 or higher, and preferably 210 or higher. Dispersion is the difference between the refractive indices determined for light of two different wave lengths; specific dispersion is dispersion divided by density, both constants being determined at the same temperature. In addition, another requirement of the feed is that the bromine number (cg/g) should be 40 or higher, and preferably 60 or higher. Such specifications are frequently used and, in fact, completely characterize these unsaturated hydrocarbon extracts.

The hydrocarbon extract is treated with from 0.25 to 3% of a Friedel-Crafts catalyst such as $BF_3$ or an aluminum halide, for example, $AlCl_3$ or $AlBr_3$ at temperatures of $-20$ to $+95°$ C., preferably 0 to 70° C. The polymerized product is water or caustic washed to remove any residual catalyst. The reaction product is then stripped to remove unreacted hydrocarbons, chiefly aromatics, leaving a resinous product. Ordinarily the final stripping is carried out under vacuum to an end point which represents or is equivalent to a bottoms (resin) temperature of about 250–270° C. at 2–5 mm. Hg. Alternately, steam stripping or a combination of steam and vacuum stripping may be used.

The aluminum halide catalysts may be used as solids or they may be employed as solutions, slurries or complexes. Hydrocarbon complexes of the catalysts, obtained by reaction of the aluminum halide with a resin raffinate containing about 60% olefins and 40% aromatics, are also quite useful.

The polymerization can be carried out either as a batch or continuous process with equally good results in product quality, provided the extraction is properly done.

It is to be understood that this polymerization process, in addition to giving valuable resins, also produces an aromatic concentrate which can be further distilled to give the individual aromatics, i. e. C8, C9, C10, etc. in high purity. Likewise, the raffinate from the extraction process can be further treated (acid, clay, etc.) to remove the di-olefins leaving a mixture of olefins which can be further used for oxonation to aldehydes and alcohols, for hydration to alcohols, and for other conversions. The raffinate can also be treated with AlCl3 to give non-aromatic types of resins which are useful for some special applications in the trade.

Normally, extraction removes the more polar and consequently the more darkly colored compounds of the feed. It would be expected therefore that resins prepared from these extracts would be darker colored than those prepared from the original naphtha. It is, therefore, surprising that all of the "extract" resins prepared according to this invention are at least equal in color and, in most cases, are even lighter in color than those prepared from the original unextracted naphthas.

The following examples are presented to further illustrate the invention but it is not intended that it be limited thereto.

EXAMPLE 1

A series of steam cracked distillate fractions boiling within or over the range of 35 to 285° C. were extracted to give the extracts described in Table I. Each distillate and its corresponding extract were polymerized by treating with 1% AlCl3 at 20–25° C. In carrying out these reactions, the catalyst was added to the reaction vessel containing the naphtha, over a 15 to 30 minute period. After completion of the catalyst addition, the reaction mixture was agitated at the reaction temperature for an additional 30–45 minute period. After quenching by the addition of water or 5% aqueous H2SO4 solution and then water washing, the polymerized resin product was recovered by stripping to a bottoms (resin) temperature of 250–270° C. at 2–10 mm. Hg. The data in Table I show that the original naphthas, as well as extracts of naphthas, having specific dispersion values below 200 give resins of lower softening points than do unsaturated feeds having specific dispersions of 200 or higher. Resins produced from the latter feeds show major improvements in resin properties with respect to higher softening points and lower unsaturation. These latter resins have as good or better color than those prepared from the original naphthas.

The extract of the naphtha boiling as low as 100° C. (20 weight per cent of naphtha boiling below 130° C.) shows some improvement in resin softening point and unsaturation as compared to a resin prepared from the original fraction. However, it is apparent that the weight per cent of naphtha boiling below 130° C. is preferably maintained at less than 20% on the naphtha to realize major improvements in extract and consequently in resin yields, softening points and unsaturation.

Specific dispersion values determined in the present invention are according to the following equation:

$$\text{Specific dispersion} = \frac{(N_f^{20} - N_c^{20}) \times 10^4}{d_4^{20}}$$

wherein $N_f^{20}$ = refractive index of the extract at 20° C. at a wave length of $f$ which is that of the beta line of hydrogen; $N_c^{20}$ = refractive index of the extract at 20° C. at a wave length of $c$ which is that of the alpha line of hydrogen; and $d_4^{20}$ = density of the extract at 20° C. compared to the density of water at 4° C.

NOTE.—(Beta line of hydrogen equals 4,861 Angstroms and alpha line of hydrogen equals 6,563 Angstroms; see "Grosse and Walker," Industrial and Engineering Chemistry, Analytical edition, volume 11, page 614, 1939).

Table I

| Naphtha feed No. | Hydrocarbon feed | | | | | | Polymerization | | Resin product | | | |
|---|---|---|---|---|---|---|---|---|---|---|---|---|
| | Boiling range, °C. | Wt. per cent of naphtha boiling below 130° C. | Extract from naphtha No. | Vol. per cent extracted [a] | Specific dispersion [c] | Bromine No. cg Br/g | Wt. percent catalyst on feed | Reaction temp., °C. | Yield, wt. percent | Soft. pt., °C. [d] | Iodine No. [e] | Color [f] |
| 1 | 35–140 | 95 | | 0 | 159 | | 1% AlCl3 | 20–25 | [g] 36.0 | 90 | | |
| 1a | 35–140 | 95 | 1 | 34 | 178 | | 1% AlCl3 | 20–25 | [h] 34.0 | 90 | | |
| 2 | 35–285 | 31.5 | | 0 | 174 | | 1% AlCl3 | 20–25 | 26.4 | 105 | 170 | 9 |
| 2a | 35–285 | 31.5 | 2 | [b] 30 | 198 | | 1% AlCl3 | 20–25 | 28.6 | 105 | 119 | 9 |
| 3 | 100–275 | 20 | | 0 | 176 | 73.5 | 1% AlCl3 | 20–25 | 20.8 | 95 | 136 | 9 |
| 3a | 100–275 | 20 | 3 | 37.9 | 200 | 60.9 | 1% AlCl3 | 20–25 | [i] 21.1 | 110 | 124 | 9 |
| 4 | 130–230 | 3 | | 0 | 188 | 80.6 | 1% AlCl3 | 20–25 | [i] 26.2 | 110 | 108 | 8 |
| 4a | 130–230 | 3 | 4 | 27.3 | 215 | 75.7 | 1% AlCl3 | 20–25 | [i] 37.5 | 131 | 82 | 6 |
| 5 | 140–230 | 0 | | 0 | 191 | 78 | 1% AlCl3 | 20–25 | 25.0 | 93 | 116 | 9 |
| 5a | 140–230 | 0 | 5 | 29.5 | 220 | 75 | 1% AlCl3 | 20–25 | 41.6 | 121 | 71 | 8 |
| 6 | 140–250 | 0 | | 0 | 188 | 78 | 1% AlCl3 | 20–25 | 25.9 | 106 | 119 | 8 |
| 6a | 140–250 | 0 | 6 | 28.0 | 225 | 77.3 | 1% AlCl3 | 20–25 | 33.4 | 123 | 88 | 7 |
| 7 | 145–230 | 0 | | 0 | 191 | 80 | 1% AlCl3 | 20–25 | 18.1 | 104 | 115 | 8 |
| 7a | 145–230 | 0 | 7 | 30.7 | 221 | 76 | 1% AlCl3 | 20–25 | 41.0 | 128 | 70 | 5 |

[a] Using triethylene glycol.
[b] Using β,β'-oxydipropionitrile.
[c] Spec. dispersion = $\frac{(N_f^{20} - N_c^{20}) \times 10^4}{d_4^{20}}$, accurate to ±5 (see Grosse and Walker, Ind. and Eng. Chem., Analytical Edition, volume 11, page 614 (1939)).
[d] Ring and ball method (ASTM E-28-51-T).
[e] ASTM (D-555-47).
[f] Color of solution of 1 g. resin/67 ml. xylenes compared to Gardner color index.
[g] Aniline point of 130° C. (ASTM procedure D-611-52, using 10 g. of resin instead of 10 ml. of sample).
[h] Aniline point of 126° C.
[i] Aniline point below −9° C.

EXAMPLE 2

In another series of runs, a steam cracked distillate fraction boiling in the range of 132–250° C. and triethylene glycol extracts thereof, were polymerized using the conditions given in Example 1. The extracts, representing about 16.5 to 35.9 volume per cent of the original fraction gave markedly improved resin yields and improved resin properties compared to the original fraction. It will also be noted that the extracts gave lighter colored resins than did the original naphtha. The extract and resin properties are summarized in Table II.

Table II

| Naphtha feed No. | Hydrocarbon feed | | | | | | Polymerization | | Resin product | | | |
|---|---|---|---|---|---|---|---|---|---|---|---|---|
| | Boiling range, °C. | Wt. percent of naphtha boiling below 130° C. | Extract from naphtha No. | Vol. percent extracted a | Specific dispersion b | Bromine No. cg Br/g | Wt. percent catalyst on feed | Reaction temp., °C. | Yield, wt. percent | Soft. pt., °C. c | Iodine No. d | Color e |
| 8 | 132–250 | 2 | | 0 | 191 | 76.9 | 1% AlCl₃ | 20–25 | f 29.0 | 111 | 116 | 9 |
| 8a | 132–250 | 2 | 8 | 16.5 | 229 | 65 | 1% AlCl₃ | 20–25 | f 36.9 | 135 | 78 | 8 |
| 8b | 132–250 | 2 | 8 | 25.5 | 227 | 66 | 1% AlCl₃ | 20–25 | 38.2 | 131 | 76 | 8 |
| 8c | 132–250 | 2 | 8 | 35.9 | 222 | 67 | 1% AlCl₃ | 20–25 | f 38.9 | 122 | 89 | 7 | a Using triethylene glycol.

b Spec. dispersion = $\frac{(N_f^{20}-N_c^{20})\times 10^4}{d_4^{20}}$, accurate to ±5 (see Grosse and Walker, Ind. and Eng. Chem., Analytical Edition, volume 11, page 614 (1939)).

c Ring and ball method (ASTM E–28–51–T).
d ASTM (D–555–47).
e Color of solution of 1 g. resin/67 ml. xylenes compared to Gardner color index.
f Aniline point below −9°C.

EXAMPLE 3

In another series of experiments a steam cracked distillate fraction boiling in the range of 130 to 260° C., and having a specific dispersion of 185 and a Bromine No. of 73.4 was used. This naphtha and the extract thereof, the latter having a specific dispersion of 214 and a Bromine No. of 67, were polymerized under various conditions and with various catalysts as shown in Table III. The results show that the unsaturated extracts having specific dispersion above 200 give greatly improved resin yields and properties over a wide range of polymerization conditions.

From these data and the polymerization data on extracts having similar properties given in the preceding examples it is apparent that the polyethylene glycols or β,β'-dipropionitrile are the preferred solvents.

What is claimed is:

1. A process for producing improved resins from petroleum fractions which comprises polymerizing in the presence of an aluminum halide catalyst at a temperature of −20° to +95° C. an extract from the solvent extraction of a steam-cracked petroleum stream boiling in the range of 35 to 280° C. by means of a solvent selected from a group selected from diethylene glycol,

Table III

| Naphtha feed No. | Hydrocarbon feed | | | | | | Polymerization | | Resin product | | | |
|---|---|---|---|---|---|---|---|---|---|---|---|---|
| | Boiling range, °C. | Wt. percent of naphtha boiling below 130° C. | Extract from naphtha No. | Vol. percent extracted a | Specific dispersion b | Bromine No. cg Br/g | Wt. percent catalyst on feed | Reaction temp., °C. | Yield, wt. percent | Soft. pt., °C. c | Iodine No. d | Color e |
| 9 | 130–260 | 3 | | 0 | 185 | 73.4 | 1% AlCl₃ | 20–25 | 27.0 | 110 | 118 | 9 |
| 9a | 130–260 | 3 | 9 | 33.5 | 214 | 67 | 2% AlCl₃ | −10 | 32.8 | 121 | 88 | 8 |
| 9b | 130–260 | 3 | 9 | 33.5 | 214 | 67 | 0.5% AlCl₃ | 55–60 | 29.2 | 114 | 96 | 7 |
| 9c | 130–260 | 3 | 9 | 33.5 | 214 | 67 | 1% AlBr₃ | 20–25 | 35.5 | 124 | 90 | 7 | a Using triethylene glycol.

b Spec. dispersion = $\frac{(N_f^{20}-N_c^{20})\times 10^4}{d_4^{20}}$, accurate to ±5 (see Grosse and Walker, Ind. and Eng. Chem., Analytical Edition, volume 11, page 614 (1939)).

c Ring and ball method (ASTM E–28–51–T).
d ASTM (D–555–47).
e Color of solution of 1 g. resin/67 ml. xylenes compared to Gardner color index.

EXAMPLE 4

A fraction of unsaturated steam cracked distillate boiling in the range of about 130 to 260° C. was extracted with several solvents and the specific dispersion values of the extracts were measured in determining their value as feed stocks for producing high quality resins. These results are summarized in Table IV.

Table IV

LIQUID-LIQUID EXTRACTION OF A 130–200° C. FRACTION OF STEAM CRACKED DISTILLATE

| Solvent | Wt. percent of fraction extracted | Specific dispersion of extract |
|---|---|---|
| Diethylene glycol | 15 | 215 |
| Triethylene glycol | 33.5 | 214 |
| Polyethylene glycol (mixture of tetra and pentaethylene glycols) | 32.5 | 212 |
| β,β'-oxydipropionitrile | 37.5 | 210 |
| Methanol | Miscible | |
| Aqueous methanol (90 vol. percent CH₃OH) | 35.0 | 193 |
| Liquid SO₂ | Miscible | | triethylene glycol, tetraethylene glycol, penta ethylene glycol and β,β'-oxydipropionitrile, said extract having a bromine number (cg/g) of at least 40 and a specific dispersion of at least 200, said specific dispersion being;

$$\frac{(N_f^{20}-N_c^{20})\times 10^4}{d_4^{20}}$$

wherein $N_f^{20}$ = refractive index of the extract at 20° C. at a wave length of $f$ which is that of the beta line of hydrogen; $N_c^{20}$ = refractive index of the extract at 20° C. at a wave length of $c$ which is that of the alpha line of hydrogen; and $d_4^{20}$ = density of the extract at 20° C. compared to the density of water at 4° C.

2. A petroleum resin product produced by the process of claim 1.

3. A process for producing improved resins from petroleum fractions which comprises polymerizing in the presence of an aluminum halide catalyst at a temperature of 0° to 70° C. an extract from the solvent extraction of a steam-cracked petroleum stream boiling in the range of 35° to 280° C. by means of a solvent selected from a group selected of diethylene glycol, triethylene glycol, tetraethylene glycol, penta ethylene glycol and $\beta,\beta'$-oxydipropionitrile, said extract having bromine number (cg/g) of at least 60 and a specific dispersion of at least 200, said specific dispersion being;

$$\frac{(N_f^{20}-N_c^{20})\times 10^4}{d_4^{20}}$$

wherein $N_f^{20}$=refractive index of the extract at 20° C. at a wave length of $f$ which is that of the beta line of hydrogen; $N_c^{20}$=refractive index of the extract at 20° C. at a wave length of $c$ which is that of the alpha line of hydrogen; and $d_4^{20}$=density of the extract at 20° C. compared to the density of water at 4° C.

4. A petroleum resin product produced by the process of claim 3.

5. A process for producing improved resins from petroleum fractions which comprises polymerizing in the presence of an aluminum chloride catalyst at a temperature of —20° to +95° C. an extract from the solvent extraction of a steam-cracked petroleum stream boiling in the range of 35° to 280° C. and containing less than 20 weight per cent of a material boiling below 130° C. by means of a solvent selected from a group selected of diethylene glycol, triethylene glycol, tetraethylene glycol, penta-ethylene glycol and $\beta,\beta'$-oxydipropionitrile, said extract having a bromine number (cg/g) of at least 60 and a specific dispersion of at least 210° C., said specific dispersion being;

$$\frac{(N_f^{20}-N_c^{20})\times 10^4}{d_4^{20}}$$

wherein $N_f^{20}$=refractive index of the extract at 20° C. at a wave length of $f$ which is that of the beta line of hydrogen; $N_c^{20}$=refractive index of the extract at 20° C. at a wave length of $c$ which is that of the alpha line of hydrogen; and $d_4^{20}$=density of the extract at 20° C. compared to the density of water at 4° C.

6. A process for producing improved resins from petroleum fractions which comprises polymerizing in the presence of an aluminum chloride catalyst at a temperature of —20° to +95° C. an extract from the solvent extraction of a steam-cracked petroleum stream boiling in the range of 115° to 260° C. by means of triethylene glycol, said extract having a bromine number (cg/g) of at least 40 and a specific dispersion of at least 200, said specific dispersion being;

$$\frac{(N_f^{20}-N_c^{20})\times 10^4}{d_4^{20}}$$

wherein $N_f^{20}$=refractive index of the extract at 20° C. at a wave length of $f$ which is that of the beta line of hydrogen; $N_c^{20}$=refractive index of the extract at 20° C. at a wave length of $c$ which is that of the alpha line of hydrogen; and $d_4^{20}$=density of the extract at 20° C. compared to the density of water at 4° C.

7. A petroleum resin product produced by the process of claim 6.

8. A process for producing improved resins from petroleum fractions which comprises polymerizing in the presence of an aluminum chloride catalyst at a temperature of —20° to +95° C. an extract from the solvent extraction of a steam-cracked petroleum stream boiling in the range of 115° to 260° C. by means of tetraethylene glycol, said extract having a bromine number (cg/g) of at least 40 and a specific dispersion of at least 200, said specific dispersion being;

$$\frac{(N_f^{20}-N_c^{20})\times 10^4}{d_4^{20}}$$

wherein $N_f^{20}$=refractive index of the extract at 20° C. at a wave length of $f$ which is that of the beta line of hydrogen; $N_c^{20}$=refractive index of the extract at 20° C. at a wave length of $c$ which is that of the alpha line of hydrogen; and $d_4^{20}$=density of the extract at 20° C. compared to the density of water at 4° C.

9. A process for producing improved resins from petroleum fractions which comprises polymerizing in the presence of an aluminum chloride catalyst at a temperature of —20° to +95° C. an extract from the solvent extraction of a steam-cracked petroleum stream boiling in the range of 115° to 260° C. by means of pentaethylene glycol, said extract having a bromine number (cg/g) of at least 40 and a specific dispersion of at least 200, said specific dispersion being;

$$\frac{(N_f^{20}-N_c^{20})\times 10^4}{d_4^{20}}$$

wherein $N_f^{20}$=refractive index of the extract at 20° C. at a wave length of $f$ which is that of the beta line of hydrogen; $N_c^{20}$=refractive index of the extract at 20° C. at a wave length of $c$ which is that of the alpha line of hydrogen; and $d_4^{20}$=density of the extract at 20° C. compared to the density of water at 4° C.

10. A process for producing improved resins from petroleum fractions which comprises polymerizing in the presence of an aluminum chloride catalyst at a temperature of —20° to +95° C. an extract from the solvent extraction of a steam-cracked petroleum stream boiling in the range of 115° to 260° C. by means of $\beta,\beta'$-oxydipropionitrile, said extract having a bromine number (cg/g) of at least 40 and a specific dispersion of at least 200, said specific dispersion being;

$$\frac{(N_f^{20}-N_c^{20})\times 10^4}{d_4^{20}}$$

wherein $N_f^{20}$=refractive index of the extract at 20° C. at a wave length of $f$ which is that of the beta line of hydrogen; $N_c^{20}$=refractive index of the extract at 20° C. at a wave length of $c$ which is that of the alpha line of hydrogen; and $d_4^{20}$=density of the extract at 20° C. compared to the density of water at 4° C.

References Cited in the file of this patent

UNITED STATES PATENTS

| | | |
|---|---|---|
| 1,982,707 | Thomas | Dec. 4, 1934 |
| 1,982,708 | Thomas | Dec. 4, 1934 |
| 2,161,599 | Towne | June 6, 1939 |

OTHER REFERENCES

Thomas et al., Ind. Eng. Chem., 24, 1125–1128, October 1932.

Fulton et al., Ind. Eng. Chem., 32, 304–309, March 1940.